Nov. 1, 1927.
F. HENKEL
AQUATIC CARROUSEL
Filed April 14, 1926
1,647,623
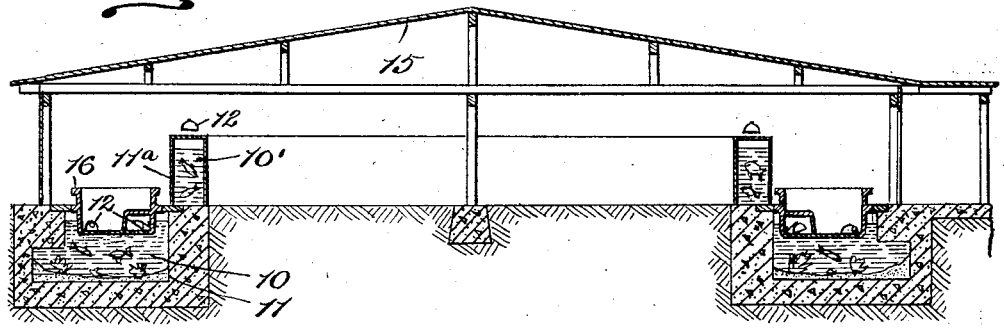
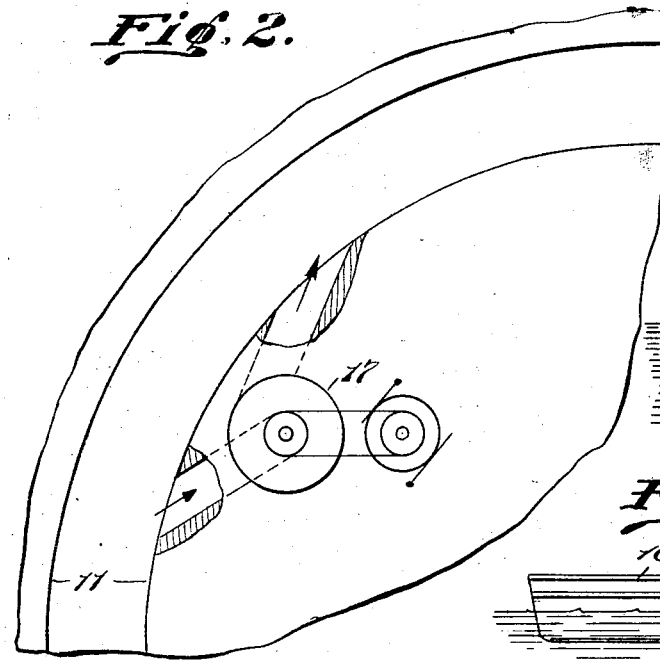
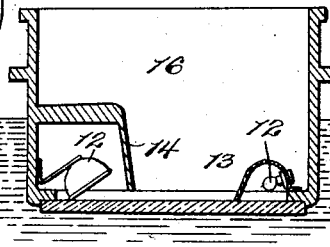
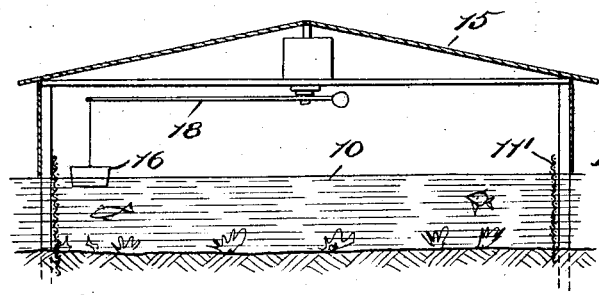
Inventor:
Frederick Henkel,
by R. S. Berry.
Attorney.

Patented Nov. 1, 1927.

1,647,623

UNITED STATES PATENT OFFICE.

FREDERICK HENKEL, OF NORWALK, CALIFORNIA.

AQUATIC CARROUSEL.

Application filed April 14, 1926. Serial No. 101,915.

This invention relates to improvements in aquatic carrousels and more particularly to an apparatus affording amusement, observation and study of subaquatic scenery, curiosities and animal and plant life.

Among the objects of my invention is to provide a body of water in which is collected and confined objects of interest; to provide means for controlling the illumination of the body of water and to provide conveniently accessible places for patrons or observants, all combined in a manner to afford a simple and inexpensive means for the observation and study of subaquatic life and objects.

Fig. 1 is a transverse sectional elevation of an apparatus constructed in accordance with my invention and in which an artificial body of water is provided;

Fig. 2 is a plan view showing a fragment of the water course of Fig. 1 and means for imparting motion thereto for movement of the passenger vessels;

Fig. 3 shows in elevation one of the vessels with its glazed open bottom;

Fig. 4 is an enlarged transverse section of the vessel, as taken on the line 4—4 of Fig. 3;

Fig. 5 is a transverse sectional elevation showing my apparatus as adapted to a natural body of water.

Referring more specifically to the drawing, 10 and 10' designate bodies of water having confining means, for a collection of objects including specimens of animal life, such as the water tight walls 11 and 11ª of Fig. 1 or the reticulate wall 11' of Fig. 5. Light controlling means are provided, such as the illuminants 12, whose rays are for projection into the body of water, and which are provided with obscurers, such as the hoods 13, or seats 14, shown in Fig. 4.

The illumination control may also include means such as the shed or enclosure 15, whose walls form a screen for the control of natural lighting and which may wholly or partially obscure the natural light.

Observation points or places for patrons, are provided and disposed in such relation to the body of water and to the light controlled area thereof as to afford unhampered view of the body of water and the objects of interest therein. By preference, the observation points comprise floats such as 16, and by further preference the floats are arranged for movement relative to the body of water. Occupants of the float 16 may view objects in both the bodies of water 10 and 10'. In Figs. 1 and 2, there is shown float moving means comprising a motor driven centrifugal pump 17 which sets and keeps in motion the body of water supporting the floats and in Fig. 5, there is shown a motor driven towing apparatus 18.

The observation points shown, the floats 16, carry certain of the light controls, such as the illuminants 12 and obscurers, the hoods 13 and seats 14 and while this is my preferred arrangement where movable observation points are provided, I do not wish to be understood as limiting myself to this showing, as obviously, when a stationary platform, float or passenger carrier is used, the light controlling devices may as well be stationary.

I claim:—

1. An apparatus of the class described comprising a pair of substantially parallel aquariums, a floating carrier, having a glass bottom, for observers, in one of the aquariums, means for moving the floating carrier, means carried by the carrier for illuminating the aquarium containing the carrier and fixed means for illuminating the other aquarium.

2. An apparatus of the class described comprising a pair of substantially parallel aquariums, a floating carrier in one of said aquariums, said carrier having a glass bottom for observers, and means for progressively moving said carrier along the aquarium which it occupies, the other aquarium being located at a higher level than the aquarium which is occupied by said carrier and having a side wall through which objects therein may be viewed by occupants of said carrier.

FREDERICK HENKEL.